United States Patent
Andriessen et al.

(10) Patent No.: US 6,811,885 B1
(45) Date of Patent: Nov. 2, 2004

(54) ACID STABLE AQUEOUS DISPERSION OF METAL PARTICLES AND APPLICATIONS

(75) Inventors: Hieronymus Andriessen, Beerse (BE); Frank Louwet, Diepenbeek (BE)

(73) Assignee: Agfa-Gevaert, Mortsel (BE)

( * ) Notice: Subject to any disclaimer, the term of this patent is extended or adjusted under 35 U.S.C. 154(b) by 277 days.

(21) Appl. No.: 09/584,489

(22) Filed: Jun. 1, 2000

Related U.S. Application Data

(60) Provisional application No. 60/140,981, filed on Jun. 29, 1999.

(30) Foreign Application Priority Data

Jun. 6, 1999 (EP) .............................. 99201895

(51) Int. Cl.[7] .......................... B32B 15/10; B32B 23/04

(52) U.S. Cl. ........................ 428/464; 428/458; 428/532

(58) Field of Search ................................ 426/532, 458; 429/464; 524/29

(56) References Cited

U.S. PATENT DOCUMENTS

| | | | | | |
|---|---|---|---|---|---|
| 3,617,320 | A | * | 11/1971 | Lee | 106/1.25 |
| 4,335,198 | A | * | 6/1982 | Hanada et al. | 346/135.1 |
| 4,388,400 | A | * | 6/1983 | Tabei et al. | 346/135.1 |
| 4,405,706 | A | * | 9/1983 | Takahashi et al. | 346/135.1 |
| 4,617,385 | A | * | 10/1986 | Namikoshi et al. | 536/98 |
| 5,521,292 | A | * | 5/1996 | Ueda et al. | 536/2 |
| 5,994,530 | A | * | 11/1999 | Posey-Dowty et al. | 536/66 |
| 6,187,508 | B1 | * | 2/2001 | Andriessen et al. | 430/273.1 |

FOREIGN PATENT DOCUMENTS

| | | | |
|---|---|---|---|
| EP | 0875889 A1 | * | 4/1998 |
| JP | 58089397 A | * | 5/1983 |

* cited by examiner

*Primary Examiner*—D. S. Nakarani
*Assistant Examiner*—Kevin R. Kruer
(74) *Attorney, Agent, or Firm*—Breiner & Breiner, L.L.C.

(57) ABSTRACT

Aqueous coating compositions containing acid stable metal dispersions, prepared by chemical reduction in aqueous medium, are obtained by using a N-quaternized cellulose derivative as binder. They can be used for the preparation of heat mode recording layers, magnetic layers and conductive layers.

14 Claims, No Drawings

ACID STABLE AQUEOUS DISPERSION OF METAL PARTICLES AND APPLICATIONS

This application claims benefit of U.S. Provisional application No. 60/140,981 filed Jun. 29, 1999.

FIELD OF THE INVENTION

The present invention deals with aqueous compositions containing dispersions of metal particles and their use in particular types of recording elements.

BACKGROUND OF THE INVENTION

In recent times, nanoscale dispersions of metal particles, prepared by chemical reduction, have gained importance as major constituents of aqueous coating compositions used for preparing particular types of recording elements. More specifically the use of these coating compositions has been disclosed for the manufacturing of heat mode recording materials, magnetic materials and conductive layers, which will now be described in more detail.

Conventional photographic materials based on silver halide are used for a large variety of applications. In the past several proposals have been made for obtaining an imaging element that can be developed using only dry development steps. Examples of such non-conventional systems are pho-tothermographic systems, e.g. 3M's dry silver technology, systems based on photopolymerization, and imaging elements that are exposed by an image-wise distribution of heat. When this heat pattern is applied directly by means of a thermal head such elements are called thermographic materials. When the heat pattern is applied by the transformation of intense laser light into heat these elements are called heat mode materials. In a particular type of heat mode recording materials information is recorded by creating differences in reflection and/or in transmission on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of a metal. For instance, the recording layers consists of bismuth, applied by evaporation in vacuo, as disclosed a.o. in EP 0 384 041. A commercially available material manufactured according to the principles of cited EP 0 384 041 is MASTERTOOL MT8, registered trade name, marketed by Agfa-Gevaert N.V. A drawback of the method of preparation of a thin bismuth recording layer by vacuum deposition is the fact that this is a complicated, cumbersome and expensive process.

Therefore, in EP 0 875 889 an alternative process for applying a thin metal layer is described comprising the following steps:

(1) preparing an aqueous-medium containing ions of a metal,
(2) reducing said metal ions by a reducing agent thus forming metal particles,
(3) coating said aqueous medium containing said metal particles on said transparent support.

In a preferred embodiment the metal layer is again a bismuth layer. However such bismuth layers coated from an aqueous medium suffer in their turn from another drawback. Compared to bismuth layers prepared by vacuum deposition their sensitivity to laser light is lower. This is due to the presence of a higher degree of oxidized bismuth, and to the presence of ballast compounds in the layer such as a binder and additives improving stability, which to a certain degree hamper the formation of microspheres by the action of laser radiation.

The drawbacks cited above were overcome by the teachings of pending European Patent application No. 98202784 published as EP-A 0 980 764 on Feb. 23, 2000, wherein a heat mode recording element is disclosed comprising, in order, (1) a transparent support optionally carrying a subbing layer,
(2) a thin metal layer coated from an aqueous medium,
(3) a protective layer or layer pack, characterized in that said heat mode recording element contains hypophosphorous acid, or phosphorous acid, or a mixture of both.

In the preferred embodiment of the cited patent the binder in the bismuth layer is carboxymethylcellulose (CMC). The reason for this choice is the fact that very small amounts of CMC or other cellulose derivatives are required to keep the concentrated metal dispersion stable. For instance, the amount in gram of CMC needed per gram of bismuth may be as low as 0.015. These very small amount allows to concentrate the metal particles dispersion, preferably by ultrafiltration, without causing an excessive increase in viscosity which would hamper the ultrafiltration and the coating of the final composition. However, it will be clear that the addition of (hypo)phosphorous acid acidifies the composition. Below a pH of about 4.5 the carboxylate groups of CMC will become protonated. As a result the stabilizing binder action of the CMC will be lost and flocculation of the bismuth dispersion is likely to occur. Therefore the practical concentration range of adding (hypo) phosphorous acid is limited and insufficient. Moreover, in storing conditions of high humidity the layer acidifies even more due to the reaction of hypophosphorous acid with residual $Bi^{3+}$ions. This leads again to flocculation in the layer and a strong decrease of Dmax. When one tries to incorporate the (hypo)phosphorous acid in the first layer of the protective layer pack (which can be an adhesive layer or a soft polymeric layer) other disadvantages occur. The presence of the (hypo)phosphorous acid is less effective and due to a certain degree of layer mixing during coating the eveness of the bismuth layer is slightly affected, resulting in loss of sensitivity and increase of Dmin.

In pending European patent application Appl. No. 98203868, which was published as EP-A 0 997 918 on May 3, 2000, a process is disclosed for the preparation of a magnetic layer, said process comprising the steps of:

(1) preparing an aqueous solution containing one or more type of metal ions including nickel ions,
(2) chemically reducing said one or more metal ions by means of a reducing agent thus forming an aqueous dispersion of metal particles including nickel,
(3) removing all superfluous ions from said aqueous dispersion by means of a washing step, preferably an ultrafiltration and/or diafiltration step, or be means of centrifugation,
(4) coating the resulting aqueous dispersion onto a support.

When it is the intention to prepare a semi-soft magnetic layer the metal ions are pure nickel ions. In the case of a soft magnetic layer the nickel ions are mixed with iron, cobalt ions, molybdene ions or mixtures of these. In order to be effective such a magnetic layer must show a rather high metal coverage, say about 15 g/m² for nickel. This can be achieved by coating a dispersion of 150 g nickel per liter at a wet thickness of 100 μm. This requires a rather high viscosity for the coating composition in the order of 50 mPa.s. Therefore the addition of a viscosity regulating compound would be useful such as polyacrylic acid which causes a viscosity dependent on pH adjustment. Of course, again a binder must be used which stabilizes the aqueous coating composition under acid conditions. This is not the case when CMC is the binder as it is the case in the preferred embodiment of the cited disclosure.

In pending European patent application Appl. No. 99200554, published as EP-A 1 031 642 on Aug. 30, 2000, a process is disclosed for the preparation of a metal oxide based conductive layer, said process comprising the following steps, in order:

(a) preparing an aqueous medium containing at least one type of metal salt,
(b) chemically reducing said metal salt by a reducing agent to form a dispersion of metal particles,
(c) washing said dispersion of metal particles,
(d) coating said washed dispersion onto a substrate, thereby obtaining a coated layer containing metal particles,
(e) subjecting said coated layer to an oxidizing treatment to form a conductive layer containing metal oxide particles.

In a most preferred embodiment the metal particles are tin particles.

It was meanwhile found by us that the oxidizing treatment is pH dependent and could be enhanced or performed at a lower temperature when an acid oxidizing agent such as boric acid ($H_3BO_3$) is added to the $Sn^0$ dispersion before coating. Again this requires the presence of an acid stable binder which is not revealed in the cited reference.

OBJECTS OF THE INVENTION

It is the object of the present invention to provide an aqueous coating composition comprising as major constituent a dispersion of metal or metal alloy particles, prepared by chemical reduction in aqueous medium, with improved colloidal stability under acid pH conditions.

It is a further object of the present invention to provide an improved heat mode recording element based on a thin metal layer coated from such an aqueous composition.

It is still a further object of the present invention to provide an improved magnetic recording element based on a thin metal layer coated from such an aqueous composition.

It is still a further object of the present invention to provide an improved metal oxide based conductive layer obtained by an oxidizing treatment of a layer coated from such an aqueous composition.

SUMMARY OF THE INVENTION

The objects of the present invention are realized by providing an aqueous composition, being stable under acid pH conditions, and comprising as major constituent a dispersion of metal or metal alloy particles, prepared by chemical reduction of metal ions in aqueous medium, characterized in that (1) said dispersion has a concentration of at least 20 g of particles per liter, (2) said particles show an average size between 5 and 200 nm, and (3) said aqueous composition further contains a N-quaternized cellulose as binder. The most preferred binder is a N-quaternized cellulose derivative having the following Chemical Abstract Index Name: cellulose, 2-hydroxyethylether, polymer with N,N,-dimethyl-N-2-propenyl-2-propen-1-aminium chloride (CA Registry Number 92183-41-0).

The scope of the present invention further encompasses a sheet or web material comprising a support and a metal layer coated from an aqueous composition as defined above. According to the metal chosen they may be used as heat mode recording material, as soft or semi-soft magnetic element, or as conductive layer after a special oxidizing treatment.

For the preparation of a heat mode recording material the preferred metal particles in the aqueous coating solution are bismuth particles. For the application as magnetic layer the metal is nickel or a mixture of nickel with one or more other metals. When the purpose is to prepare a metal oxide based conductive layer the preferred metal is tin optionally mixed with one or more other metals.

DETAILED DESCRIPTION OF THE INVENTION

The preparation of the aqueous composition and of the sheet or web material of the present invention will now be explained on the hand of a first preferred embodiment wherein the metal is bismuth and the sheet or web material serves as a heat mode recording layer.

In a first step an aqueous solution of bismuth ions is in prepared. As most suitable bismuth salt bismuth nitrate is chosen. Almost all bismuth salts are poorly soluble in water. In order to maintain a sufficient amount of bismuth ions in solution, it is necessary to add a complexing agent. A preferred complexant is simply the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N,N,N',N'-tetraacetic acid (CDTA), ethyleneglycol-O,O'-bis(2-aminoethyl)-N,N,N',N'-tetraacetic acid (EGTA), N-(2-hydroxyethyl)ethylenediamine-N,N,N'-triacetic acid (HEDTA), etc.

In a following step the bismuth ions in the solution are reduced to highly dispersed bismuth particles by means of the addition of a reducing agent. The conditions are chosen so that nanoparticles showing an average size between 5 and 200 nm are obtained. A preferred reducing agent is sodium hyposulphite. Another suitable reducing agent is $KBH_4$. Others include glucose, formaldehyde, tin(II)chloride. The reducing agent can be added to the original bismuth salt solution as a solid powder. On the other hand the reducing agent can be dissolved separately in a second aqueous medium and added to the bismuth salt solution according to a single jet or a double jet procedure. Preferably, according to the double jet principle, the aqueous medium containing the bismuth ions and the second solution containing the reducing agent are added together to a third aqueous medium.

In order to keep the bismuth particles formed by reduction in colloidal dispersion a protective binder is added to one or more of the three aqueous solution involved. Preferably, this protective binder is added to the third aqueous medium wherein both others are jetted. It is the essence of the present invention that this binder is a N-quaternized cellulose. In a most preferred embodiment this derivative is a N-quaternized carboxymethyl cellulose derivative having the following Chemical Abstract Index Name: cellulose, 2-hydroxyethylether, polymer with N,N,-dimethyl-N-2-propenyl-2-propen-1-aminium chloride (CA Registry Number 92183-41-0). Other names include 2-propen-1-aminium, N,N-dimethyl-N-2-propenyl-, chloride, polymer with cellulose 2-hydroxyethylether (9Cl); Cellcoat L200; Celquat H100; Celquat L200; Polyquatenium 4.

Thanks to the presence of the quaternary ammonium groups protonation reactions, due to acid pH conditions, e.g. as cause by the addition in a later stage of (hypo) phosphorous acid, no longer occur and as a result the colloidal stability of the composition containing the metal particles remains guaranteed even in a pH range from 5 to 1. Under storage conditions of high humidity a Dmax decrease no longer occurs in the coated Bi layer.

When the reduction is substantially completed the superfluous salts are first removed from the aqueous medium by a washing process, preferably involving ultrafiltration and/or diafiltration, and optionally centrifugation. In any of the solutions involved in the preparation a so-called dispersing aid can be present. In a preferred embodiment this compound is added to the diafiltration liquid at the last stage of the preparation. Suitable dispersing aids in the case of bismuth are pyrophosphates, more particularly a hexametaphosphate such as sodium hexametaphosphate. Probably, the hexametaphosphate adsorbs to the surface of the bismuth particles so that they become negatively charged. By electrostatic repulsion they are kept in dispersion. So in a preferred embodiment the bismuth particles are ultrafiltrated e.g. through a Fresenius F60 cartridge and subsequently diafiltrated against a solution of sodium hexametaphosphate in water/ethanol (98.5/1.5). The ultrafiltration and diafiltration steps serve also to concentrate the metal particles in the final dispersion so that rather high metal coverages are obtainable. The final dispersion must show a concentration of at least 20 g of particles per liter.

Finally, after the addition of one or more coating agents the obtained aqueous medium is coated on a transparent substrate by means of a conventional coating technique, such as slide hopper, curtain coating and air-knife coating.

Useful transparent organic resin supports include e.g. cellulose nitrate film, cellulose acetate film, polyvinylacetal film, polystyrene film, polyethylene terephthalate film, polycarbonate film, polyvinylchloride film or poly-α-olefin films such as polyethylene or polypropylene film The thickness of such organic resin film is preferably comprised between 0.05 and 0.35 mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅑ or more and increasing its area 2 to 9 times. The stretching may be accomplished in two stages, transversal and longitudinal in either order or simultaneously. The subbing layer, when present, is preferably applied by aqueous coating between the longitudinal and transversal stretch, in a thickness of 0.1 to 5 mm. In case of a bismuth recording layer the subbing layer preferably contains, as described in European Patent Application EP 0 464 906, a homopolymer or copolymer of a monomer comprising covalently bound chlorine. Examples of said homopolymers or copolymers suitable for use in the subbing layer are e.g. polyvinyl chloride; polyvinylidene chloride; a copolymer of vinylidene chloride, an acrylic ester and itaconic acid; a copolymer of vinyl chloride and vinylidene chloride; a copolymer of vinyl chloride and vinyl acetate; a copolymer of butylacrylate, vinyl acetate and vinyl chloride or vinylidene chloride; a copolymer of vinyl chloride, vinylidene chloride and itaconic acid; a copolymer of vinyl chloride, vinyl acetate and vinyl alcohol etc. Polymers that are water dispersable are preferred since they allow aqueous coating of the subbing layer which is ecologically advantageous.

Suitable coating agents include non-ionic agents such as saponins, alkylene oxides e.g. polyethylene glycol, polyethylene glycol/polypropylen glycol condensation products, polyethylene glycol alkyl esters or polyethylene glycol alkylaryl esters, polyethylene glycol esters, polyethylene glycol sorbitan esters, polyalkylene glycol alkylamines or alkylamides, silicone-polyethylene oxide adducts, glycidol derivaties, fatty acid esters of polyhydric alcohols and alkyl esters of saccharides; anionic agenst comprising an acid group such as a carboxy, sulpho, phospho, sulphuric or phosphorous ester group; ampholytic agents such as aminoacids, aminoalkyl sulphonic acids, aminoalkyl sulphates or phosphates, alkyl betaines, and amine-N-oxides; and cationic agents such as aklylamine salts, aliphatic, aromatic, or heterocyclic quaternary ammonium salts, aliphatic or heterocyclic ring-containing phosphonium or sulphonium salts. Other suitable surfactants include perfluorinated compounds.

The formation of the thin metal recording layer has been described on the hand of the preferred embodiment wherein the metal is bismuth. However, the scope of the present invention is not limited to bismuth, but extends to other metals that can form thin metal recording layers by a similar procedure. Possible other metals for the recording layer in this invention include Mg, Mn, Cu, Ag, Au, Zn, Cd, Al, Ga, In, Ge, Sn, As, Sb, Se, Te, Sr, Cu, La, Pb, Nd, Ba, Be, Ca, and Ce.

It will be readily understood that for each particular metal the choice of the metal ions, the complexant if any, the binder and dispersing aid, the reducing agent, etc., must be optimized and that the preferred embodiments will in most cases deviate from the preferred embodiments when the metal is bismuth.

Apart from the metal layer and the support described above the sheet or web material for use as heat mode recording element further comprises a protective layer or layer pack. Such a protective layer or layer pack is highly desired because the metal layer is very sensitive to mechanical damage.

Two types of protective elements are preferred.

In a first preferred particular embodiment this protective element comprises a transparent organic resin, acting as outermost cover sheet, and an adhesive layer. The adhesive layer can be of the pressure-adhesive type or of the thermoadhesive type. Examples of pressure-adhesive resins are described in U.S. Pat. No. 4,033,770 for use in the production of adhesive transfers (decalcomanias) by the silver complex diffusion transfer process, in the Canadian Patent 728,607 and in the U.S. Pat. No. 3,131,106. When the adhesive layer is of the heat-activatable, also called thermoadhesive type, the adhesive layer is preferably applied on top of the metal layer by lamination together with the resin foil to which it is preliminary applied by coating. The exterior resin foil can be chosen from the group of polymeric resins usable for the support of the heat mode element. In a preferred embodiment the cover sheet is also polyethylene terephthalate but preferably substantially thinner (about 10 μm) than the polyethylene terephthalate of the support.

A survey of pressure and/or heat-sensitive adhesives is given by J. Shields in "Adhesives Handbook", 3rd. ed. (1984), Butterworths—London, Boston, and by Ernest W. Flick in "Handbook of Adhesive Raw Materials" (1982), Noyens Publications, Park Ridge, N.J.—USA.

In a second preferred type of protective layer pack two layers are coated on top of the metal layer, a soft polymeric layer and an outermost hard polymeric layer. Combinations of useful compositions for the soft and the hard polymeric layers are described in EP 0 875 889 cited above.

The sheet or web material serving as heat mode recording material preferably contains (hypo)phosphorous acid as explained in the Background paragraph. Preferably the hypophosphorous acid or the phosphorous acid or the mixture of both is incorporated, totally or partially, in the metal layer itself. It is for this reason that the aqueous coating composition has to be stable under acid pH conditions. The acid is preferably added after ultrafiltration to the final aqueous coating solution for the metal layer right before coating. However, the (hypo)phosphorous acid may also be totally or partially incorporated in one of the layers of the protective layer pack covering the thin metal layer.

For the formation of a heat mode image using the element of the present invention any laser can be used which provides enough energy needed for the production of sufficient heat for this particular process of image formation. In a preferred embodiment a powerful infra-red laser is used, most preferably a Nd-YLF laser or diode laser.

In a second preferred embodiment of the present invention the sheet or web material serves as a soft or semi-soft magnetic element. In this case the reducible metal ions comprise nickel ions. The preparation of the aqueous composition and its coating are very analogous to the process described above for bismuth. When it is the intention to prepare a semi-soft magnetic layer the metal ions are pure nickel ions. In the case of a soft magnetic layer the nickel ions are mixed with iron, cobalt ions, molybdene ions or mixtures of these. In order to be effective such a magnetic layer must show a rather high metal coverage, say about 15 g/m$^2$ for nickel. This can be achieved by coating a dispersion of 150 g nickel per liter at a wet thickness of 100 $\mu$m. This requires a rather high viscosity for the coating composition in the order of 50 mPa.s. Therefore the addition of a viscosity regulating compound would be useful such as polyacrylic acid which causes a viscosity dependent on pH adjustment. Of course, again a binder must be used which stabilizes the aqueous coating composition under acid conditions. That is just the case when a N-quaternized cellulose binder is used which is the gist of the present invention.

For this application the support does not need necessarly to be transparent, as it is the case for the heat mode recording application, but it may be opaque. Suitable opaque support include plain paper, polyolefin coated paper, e.g. polyethylene coated paper, a polymeric resin filled in the bulk with an opacifying agent, e.g. titanium oxide, or a polymeric resin support coated with an extra opacifying subcoat.

In a third preferred embodiment of the present invention the sheet or web material may be used as metal oxide based conductive layer. In this case, after the preparation of the aqueous composition and its coating an extra oxidizing treatment of the metal particles is needed as explained in European patent application Appl. No. 99200554, cited above, published as EP-A 1 031 642 on Aug. 30, 2000.

In a most preferred embodiment the metal particles are tin particles. It was meanwhile discovered by us that the oxidizing treatment could be enhanced or performed at a lower temperature when an acid oxidizing agent such as boric acid ($H_3BO_3$) is added to the $Sn^0$ dispersion before coating. Again this requires the presence of an acid stable binder which is realized by the use of the N-quaternized cellulose binder in accordance with the present invention.

Also for this application the support can be transparent or opaque.

The present invention will now be illustrated by the following examples without however being limited thereto.

EXAMPLES

Examples 1–3 deal with the use of the aqueous composition of the present invention for the preparation of a heat mode recording element.

Example 1

Preparation of an Aqueous Composition Containing a Bismuth Dispersion (Comparison)

The following solutions were prepared:

| Solution 1 | |
|---|---|
| Water | 400 ml |
| Bi(NO$_3$)$_3$.5H$_2$O | 449 g |
| Triammonium citrate (50% in water) | 1200 ml |
| NH$_3$ (26% in water) (pH = 10.5) | 300 ml |
| Water to | 2330 ml |

| Solution 2 | |
|---|---|
| Na$_2$S$_2$O$_4$ (16.7% in water) | 1238 ml |

| Solution 3 | |
|---|---|
| Water | 1136 ml |
| Carboxymethylcellulose (3% in water) | 104 ml |

To solution 3, held at 40° C. and stirred at 450 rpm, solution 1 at a flow rate of 200 ml/min and solution 2 at a flow rate of 117 ml/min were simultaneously added. After the reduction, the bismuth dispersion was ultrafiltrated through a Fresenius F60 cartridge and diafiltrated with a 0.2% solution of sodium hexametaphosphate in water/ethanol (98.5/1.5).

The resulting aqueous composition was stirred and 10 ml of a 12.5% solution of Saponine Quillaya (Schmittmann) in water/ethanol (80/20) was added. This is bismuth composition 1 (comparison).

The dispersion was analysed for its particle size distribution (weight average d$_{wa}$) with the Disc Centrifuge Photosedimentometer BROOKHAVEN BI-DCP. A d$_{wa}$ of 65 nm (s$_{wa}$=6) was obtained.

Preparation of an Aqueous Coating Composition Containing a Bismuth Dispersion (Invention)

| Solution 4 | |
|---|---|
| Water | 400 ml |
| Bi(NO$_3$)$_3$.5H$_2$O | 449 g |
| Triammonium citrate (50% in water) | 1200 ml |
| NH$_3$ (26% in water) (pH = 8.7) | 200 ml |
| Water to | 2330 ml |

| Solution 5 | |
| --- | --- |
| Water | 1100 ml |
| Celquat H100 (3% in water) (National Starch and Chemical Co.) | 130 ml |

To solution 5, held at 40° C. and stirred at 450 rpm, solution 4 at a flow rate of 200 ml/min and solution 2, previously described, at a flow rate of 117 ml /min were added simultaneously. After the reduction, the bismuth dispersion was ultrafiltrated through a Fresenius F60 cartridge and diafiltrated with a 0.2% solution of sodium hexametaphosphate in water/ethanol (98.5/1.5).

The resulting aqueous composition was stirred and 10 ml of a 12.5% solution of Saponine Quillaya (Schmittmann) in water/ethanol (80/20) was added. This is bismuth composition 2 (invention).

The dispersion was analysed for its particle size distribution (weight average $d_{wa}$) with the Disc Centrifuge Photo-sedimentometer BROOKHAVEN BI-DCP. A $d_{wa}$ of 75 nm ($s_{wa}$=12) was obtained.

The comparison and invention compositions 1 and 2 were divided in small portions and to each of these portions a certain amount of a 50% solution of $H_3PO_2$ (Merck) was added according to table 1.

Coating and Evaluation of Heat Mode Recording Elements.

Subsequently the final aqueous compositions were coated on a subbed PET support so that a density of 3.5 (Macbeth optical densitometer) was obtained. Thereupon a protective laminate comprising a 8 μm thick pressure-adhesive layer, type DURO-TAK 380-2954, National Starch and Chemical Co., and a 12 μm thick PET foil was laminated by using the CODOR LAMIPACKER LPP650 at room temperature.

The exposure was performed by a Barco-Elise laser writer. Dmin is the value obtained at a laserpower of 5 Watt. Table 1 lists the obtained results.

TABLE 1

| Sample | Binder | $H_3PO_2$ to pH | Dmax | Dmin | Bubbles* | Dmax** |
| --- | --- | --- | --- | --- | --- | --- |
| 1 (comp) | CMC | 4.9 | 4.25 | 0.52 | many | −0.75% |
| 2 (comp) | CMC | 2.0 | <0.50*** | — | — | — |
| 3 (inv) | Celquat | 4.9 | 2.30 | 0.37 | few | −1.3% |
| 4 (inv) | Celquat | 2.0 | 3.94 | 0.33 | none | −4.8% |

Bubbles*: after recording, bubble formation in the layer sometimes occurs;
Dmax** = percentage Dmax loss after 3 days 57° C./34% RH
*** = flocculated dispersion It is clear from table 1 that the image quality obtained with the samples in accordance with the invention is far better than with the comparison samples.

Example 2

To composition 1, described in the previous example, hypophosphorous acid was added until an pH of 4.9 was reached. To It composition 2 (containing CELQUAT), hypophosphorous acid was added until a pH of 2.0 was reached. Subsequently, these dispersions were coated on a subbed PET support so that a density of 3.5 (Macbeth optical densitometer) was obtained.

Upon the layer coated from composition 1 a protective laminate comprising a 4 μm thick pressure-adhesive layer, type PSA 231 (Adhesive International Limited) and a 12 μm thick PET foil was laminated by using the CODOR LAMI-PACKER LPP650 at room temperature. To 11 g PSA 231, 0.25 ml of a 50% solution of $H_3PO_2$ (Merck) was added in order to obtain the same amount of hypophosphorous acid in the material as the one coated with composition 2. Upon the layer coated from composition 2 a protective laminate comprising a 4 μm thick pressure-adhesive layer, type PSA 231 and a 12 μm thick PET foil was laminated by using the CODOR LAMIPACKER LPP650 at room temperature without adding hypophosphorous acid to the PSA 231.

The exposure was again performed by a Barco-Elise laser writer. Dmin is the value obtained at a laserpower of 5 Watt. Table 2 lists the obtained results.

TABLE 2

| Sample | Binder | $H_3PO_2$ to pH (Bi-dispersion) | Added $H_3PO_2$ to PSA 231 | Dmax | Dmin | Bubbles |
| --- | --- | --- | --- | --- | --- | --- |
| 5 (comp) | CMC | 4.9 | yes | 4.00 | 0.54 | many |
| 6 (inv) | Celquat | 2.0 | no | 4.00 | 0.44 | few |

Dmax** = percentage Dmax loss after 3 days 57° C./34% RH
Dmax*** = percentage Dmax loss after 3 days 34° C./80% RH The conclusions are similar to those of example 1.

Example 3

In this example the pressure-adhesive layer was coated instead of laminated as in example 2.

To composition 1, described in the previous examples, hypophosphoric acid was added until an pH of 4.9 was reached. To composition 2 (containing CELQUAT), hypophosphorous acid was added until a pH of 2.0 was reached. Subsequently, these dispersions were coated on a subbed PET foil so that a density of 3.5 (Macbeth optical densitometer) was obtained. Upon the coated dispersion 1, a 4 μm thick pressure-adhesive layer, type PSA 231 containing 0.25 ml of a 50% solution of $H_3PO_2$ per 11 g PSA 231 was coated. Subsequently, a 12 μm thick PET foil was laminated by using the CODOR LAMIPACKER LPP650 at room temperature Upon the layer coated from composition 2, the same PSA 231 containing layer without hypophosphorous acid was coated. Subsequently, a 12 μm thick PET foil was laminated by using the CODOR LAMIPACKER LPP650 at room temperature.

The exposure was again performed by a Barco-Elise laser writer. Dmin is the value obtained at a laserpower of 5 Watt. Table 3 lists the obtained results.

TABLE 3

| Sample | Binder | $H_3PO_2$ to pH (Bi-dispersion) | Added $H_3PO_2$ to PSA 231 | Dmax | Dmin | Bubbles |
| --- | --- | --- | --- | --- | --- | --- |
| 7 (comp) | CMC | 4.9 | yes | 3.45 | 0.50 | few |
| 8 (inv) | Celquat | 2.0 | no | 3.71 | 0.55 | none |

Dmax** = percentage Dmax loss after 3 days 57° C./34% RH
Dmax*** = percentage Dmax loss after 3 days 34° C./80% RH The conclusions are similar to those of the previous examples.

What is claimed is:
1. A sheet or web material comprising a support and a metal layer coated from an aqueous composition comprising a dispersion of metal or metal alloy particles, prepared by chemical reduction of metal ions in aqueous medium, wherein (1) said dispersion has a concentration of at least 20 g of particles per liter, (2) said particles show an average size between 5 and 200 nm, and (3) said aqueous composition further includes a N-quaternized cellulose as binder.

2. A sheet or web material according to claim 1 wherein said support is a transparent support.

3. A sheet or web material according to claim 1 wherein said coated metal layer is a bismuth layer.

4. A sheet or web material according to claim 1 wherein said metal layer further comprises hypophosphorous acid, or phosphorous acid, or a mixture of both.

5. A sheet or web material according to claim 1 wherein said metal particles comprise nickel particles.

6. A sheet or web material according to claim 5 wherein said metal particles further comprise iron particles, cobalt particles or molybdenum particles or mixture thereof.

7. A sheet or web material according to claim 1 wherein said metal particles comprise tin particles.

8. A sheet or web material according to claim 1 wherein said N-quaternized cellulose is cellulose, 2-hydroxyethylether, polymer with N,N,-dimethyl-N-2-propenyl-2-propen-1-aminium chloride (Chemical Abstract Index Name).

9. A sheet or web material according to claim 1 wherein said material is subjected to image-wise exposure by laser radiation.

10. A sheet or web material according to claim 1 wherein said material is subjected to oxidative treatment to provide a metal oxide-based conductive element.

11. A sheet or web material according to claim 1 wherein said material further comprises a protective layer or layer pack.

12. A sheet or web material according to claim 11 wherein said protective layer pack comprises an adhesive layer and an outermost polymeric resin foil.

13. A sheet or web material according to claim 11 wherein said protective layer pack comprises a soft polymeric layer and an outermost hard polymeric layer.

14. A sheet or web material according to claim 11 wherein said protective layer or layer pack further comprises hypophosphorous acid, or phosphorous acid, or a mixture of both.

* * * * *